(No Model.)

W. DUNCAN.
SELF LUBRICATING TROLLEY WHEEL.

No. 463,733. Patented Nov. 24, 1891.

Witnesses:

Inventor.
William Duncan

United States Patent Office.

WILLIAM DUNCAN, OF ALLEGHENY, PENNSYLVANIA.

SELF-LUBRICATING TROLLEY-WHEEL.

SPECIFICATION forming part of Letters Patent No. 463,733, dated November 24, 1891.

Application filed September 24, 1890. Serial No. 366,025. (No model.)

*To all whom it may concern:*

Be it known that I, WILLIAM DUNCAN, a citizen of the United States, residing at Allegheny, in the county of Allegheny and State of Pennsylvania, have invented certain new and useful Improvements in Self-Lubricating Trolley-Wheels; and I do hereby declare the following to be a full, clear, and exact description of the invention, such as will enable others skilled in the art to which it pertains to make and use the same, reference being had to the accompanying drawings, which form a part of this specification.

My invention relates to an improved self-lubricating trolley-wheel; and it consists in a hollow wheel having the hubs of the same projecting inwardly, suitable steel bushings inserted in the said hubs, and a leather washer to act as a feeder, together with certain other details of construction, as will be fully set forth hereinafter.

Figure 1:
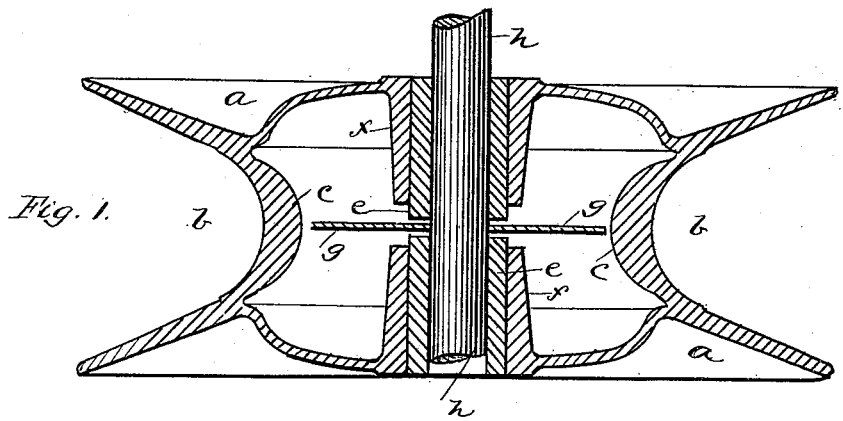
Figure 2:
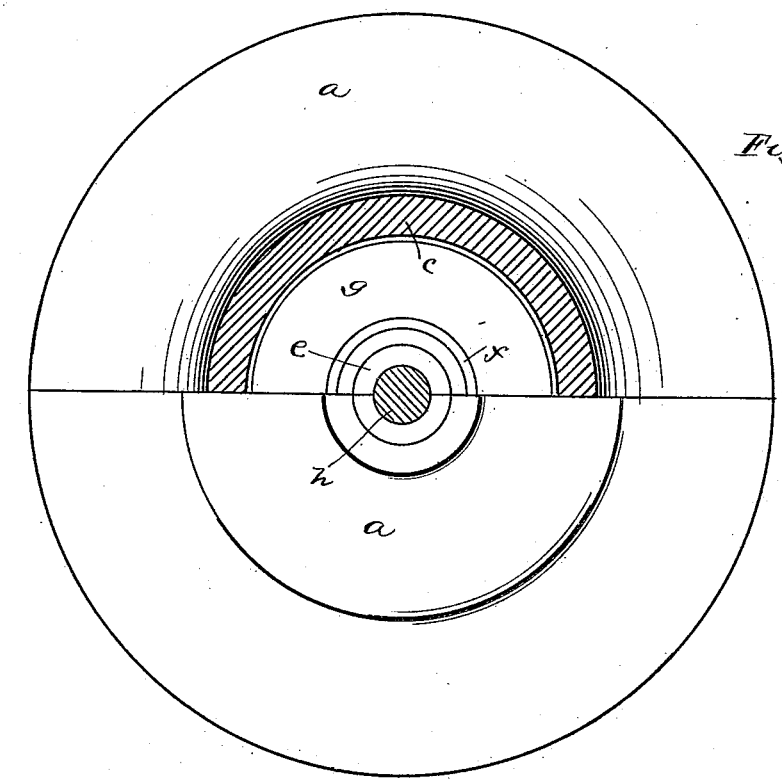

In the accompanying drawings, Figure 1 is a full-sized sectional plan view of my improved wheel, which is constructed in accordance with my invention. Fig. 2 is a half-sectional and front elevation of the same.

To construct a self-lubricating wheel in accordance with my invention, I provide a wheel $a$, having a deep groove $b$ formed about its periphery, in which the trolley-line wire is made to operate. Formed at the base of this groove $b$ and integral with the wheel is a heavy annular portion $c$, which is thus formed to make the wheel lasting, as the entire wear is at that portion $c$ of the wheel. Formed through the center of this wheel $a$ is an opening for the bearing-shaft $h$, in which two steel bushings $e$, slightly tapering, are driven, which revolve with the wheel $a$ on the shaft $h$. Formed integral with the wheel $a$ are inwardly-projecting hubs $f$, which are separated the one from the other by an intervening space. Occupying a position between these hubs $f$ and bushings $e$ and attached to the shaft $h$ is a circular piece of leather $g$, which is about the same diameter as that of the heavy portion $c$ of the wheel. This disk $g$ is used as a feeder and will conduct the oil to the shaft $h$.

In operation the wheel $a$ is cast in one piece and the inner circles of the hubs $f$ finished. The wheel $a$ is now fitted with the bushings $e$ and disk $g$, and a quantity of oil or other suitable lubricant placed in the cavity $i$ and the shaft $h$ put in place. The wheel $a$ is now mounted in a suitable frame, and when in operation revolves in a vertical position by being brought in close contact with the conductor in a manner well known to the art. The outer periphery of the disk, being submerged in the oil and having a rapid revolving motion, will conduct a small continuous stream of oil to the shaft $h$, which will dispense the same along its bearings. By forming the hubs $f$ in the manner described the wheel $a$ may be placed in any position without spilling the oil.

The washer is made of leather, soft rubber, or other flexible material, and can be readily doubled up and folded in a compact manner for insertion into the openings between the hubs. After the washer has been forced or otherwise inserted into the interior of the wheel it will unfold and resume its former shape, and will occupy a position between the two bushings on the shaft, at right angles thereto.

Having thus described my invention, I claim—

1. The herein-described self-lubricating trolley-wheel, having the side walls forming the intermediate chamber, the inwardly-extending hubs $f$, the shaft extending through the hubs, the bushing seated in the hubs and fitting snugly on the shaft, and the washer fitted on the shaft between the hubs, substantially as described.

2. A trolley-wheel having the groove extending around its periphery and the flared projecting edges on either side thereof, the thickened portion at the apex of the groove extending into the chamber of the wheel and forming a smooth wearing-surface, the inwardly-extending hubs $f$, the shaft extending through the hubs, the bushings, and the washer, substantially as described.

In testimony that I claim the foregoing I hereunto affix my signature this 10th day of September, A. D. 1890.

WILLIAM DUNCAN. [L. S.]

In presence of—
M. E. HARRISON,
CHARLES LARGE.